Patented June 5, 1923.

1,457,709

UNITED STATES PATENT OFFICE.

CHRISTEN JOHANNES STAUTSBÖLL LUNDSGAARD, OF VEJEN, DENMARK.

EXPLOSIVE.

No Drawing. Application filed September 1, 1920. Serial No. 407,308.

*To all whom it may concern:*

Be it known that I, CHRISTEN JOHANNES STAUTSBÖLL LUNDSGAARD, a subject of the King of Denmark, residing at Vejen, Denmark, have invented new and useful Improvements in Explosives; and I do hereby declare the following to be a full, clear, and exact description of the same.

It has previously been known that through acting of perchloric acid or its compounds upon alcohols alkyl perchlorates can be produced which have a great explosive power. These substances, however, have not been used in the art of explosives partly because they are too sensitive to mechanical influences and partly because they are too easily saponified. Now I have ascertained that through action of perchloric acid or its compounds upon organic, cyclic amines or amino-compounds substances can be produced which possess great explosive power and stability. Thus perchlorates of aniline, phenylene-diamine (ortho-, meta-, and para-compounds), benzidine, the various toluidines, naphthlyamines, naphthylendiamines, amidoazobenzene, diamidoazo benzene, antipyrine, malachite-green, fuchsine, methylviolet, pyridine, chinoline, and cinchonine, have been produced which are all very stable even at higher temperatures (100° C). Likewise all of the named substances are possessed of explosive qualities which, however, are different for the various substances. Thus the coupling together of more rings (for instance benzidine, diamidoazobenzene, and the like) appear to augment the speed of detonation. A similar effect appears to be due to the introduction of a nitrogen atom in the ring (hetorocyclic compounds). The sensitiveness to moisture of the various substances is rather different, part of the substances, (for instance perchlorates of antipyrine, malachite-green, fuchsine, methylviolet), thus being only slightly solvable or undissolvable in water, others, such as metaphenylenediamine perchlorate, being rather easily dissolvable, while for instance paraphenylenediamine perchlorate is very indifferent against moisture even if it is rather easily dissolved in water. Thus, for in instance, initiating capsules with para-phenylendediamine perchlorate as intermediate charge have been kept in a damp room for until three months before failures were observed.

Many of the above mentioned substances, and particularly paraphenylenediamine perchlorate, are well suited for use as intermediate charge in detonators. It has thus been found that 0.25 grams para-phenylenediamine perchlorate which is pressed into a copper capsule by a pressure of 1200 kilograms per square centimeter, on ignition by means of 0.4 grams mercury fulminate beats a hole of 7 to 8 millimeters in diameter in a lead plate of 7 millimeters thickness, the capsule being disposed perpendicularly to the lead plate.

The ignition of the said substances occurs very easily. Para-phenylenediamine is promptly ignited by means of 0.2 grams mercury fulminate.

As an example of producing para-phenylenediamine the following methods can be used.

One hundred eight parts by weight of para-phenylenediamine are introduced in a solid state into a solution consisting of 200 parts perchloric acid to 500 parts water, and the resulting solution is evaporated until crystallization occurs. The crystals are preferably washed once with water and dried.

Also a hot strong solution of para-phenylenediamine chloride can be mixed with a hot strong solution of sodium perchlorate. Upon cooling of the mixture the sodium chloride is first separated out and removed from the solution whereafter the solution is evaporated until crystallization takes place. The substance produced in this manner has a red brown colour and is not hygroscopic.

The separating of the substance from the solution can also be effected through addition of alcohol to the same.

From these explosives new explosives can be produced by mixing them with each other or with already known explosives or with oxygen-yielding or absorbing substances. Likewise the explosion temperature or the quantity of aciduous products of combustion may be reduced by adding to the same substances generally used for this purpose such as chlorides or carbonates of sodium, ammonium, magnesium or the like.

Having thus fully described my invention I claim as new and desire to secure by Letters Patent:

1. An explosive comprising a perchlorate of an organic cyclic ammonium compound.

2. An explosive comprising a compound produced by the action of perchloric acid upon aromatic amine compounds containing at least one ring.

3. An explosive containing para-phenylenediamine perchlorate.

4. An explosive comprising a perchlorate of an organic cyclic ammonium compound and a constituent for lowering the explosion temperature.

5. A detonator containing a perchlorate of an organic cyclic ammonium compound.

In testimony whereof I have affixed my signature in presence of two witnesses.

CHRISTEN JOHANNES STAUTSBÖLL LUNDSGAARD.

Witnesses:
 VIGGO BLOW,
 FANNY PETERSEN.